United States Patent [19]

Miller

[11] Patent Number: 5,593,756

[45] Date of Patent: Jan. 14, 1997

[54] HOLD-DOWN COVER FOR CABLES AND THE LIKE

[76] Inventor: Terry Q. Miller, 10195 Maymie Rd., Boise, Id. 83703

[21] Appl. No.: 357,496

[22] Filed: Dec. 16, 1994

Related U.S. Application Data

[63] Continuation-in-part of Ser. No. 103,856, Aug. 9, 1993, abandoned, which is a continuation of Ser. No. 693,952, Apr. 29, 1991, Pat. No. 5,278,356, which is a continuation-in-part of Ser. No. 535,358, Jun. 8, 1990, abandoned.

[51] Int. Cl.$^6$ ................................................. C09J 7/02
[52] U.S. Cl. ........................ 428/194; 428/195; 428/202; 428/343
[58] Field of Search ........................ 428/194, 200, 428/343, 202, 195, 906, 76, 355; 174/117 A

[56] References Cited

U.S. PATENT DOCUMENTS 2,673,643   3/1954   Blank .
3,253,085   5/1966   Stern .

*Primary Examiner*—Jenna Davis

[57] ABSTRACT

A cable hold-down structure includes an elongate, flexible substrate material whose underneath side edges are provided with adhesive, with a central section extending the length of the tape being adhesive free. The tape is employed to hold a cable on a support surface by positioning the tape lengthwise along the top of the cable, with the central section of the tape being in contact with the cable and the side edges of the tape containing adhesive adhering to the support surface on either side of the cable.

1 Claim, 1 Drawing Sheet

HOLD-DOWN COVER FOR CABLES AND THE LIKE

RELATED APPLICATIONS

This is a continuation-in-part of U.S. patent application Ser. No. 08/103,856 filed Aug. 9, 1993, now abandoned which is a continuation of U.S. patent application Ser. No. 07/693,952 filed Apr. 29, 1991 (now U.S. Pat. No. 5,278,356), which is a continuation-in-part of U.S. patent application Ser. No. 07/535,358 filed Jun. 8, 1990 (now abandoned).

BACKGROUND

This invention relates to a cover structure and method for securely holding cables and the like on a support surface.

In the entertainment and communication businesses, electrical equipment, such as cameras, lighting, sound equipment, etc., is typically utilized which requires electrical power for their operation and thus cables for carrying the power from power sources to the equipment. It is not uncommon when using such equipment to run the electrical cable some distance over floor space to facilitate use of the equipment, and such cable is oftentimes maintained in place on the floor by conventional adhesive or, more often, duct tape. The purpose for this is to secure the cable in locations to minimize the chance of someone tripping over the cable and also to prevent damage to the cable.

Moreover, in many industrial settings it is necessary to hold down cables, such as electrical cables, as well as hoses which carry fluids. In some industrial settings, it may be desired to temporarily hold down cables and hoses or it may be desired to hold down cables and hoses for a long period of time.

When it comes time to move cables and hoses such as described above, it is necessary to pull up the tape holding the cable to the underlying surface, often a floor, and this oftentimes leaves a sticky and gummy residue on the cable or hose from the tape used. This of course results in unsightly looking cables and hoses, and more difficult and messy handling of the cable or hose during the next use of the equipment unless the sticky and gummy residue is first removed-this of course would require time for cleaning, very probably with a proper cleaning solution.

Another problem with holding electrical cable and the like in place on an underlying support surface with conventional tape is that the tape is used only at certain locations along the length of the cable, and so those portions of the cable not being held by tape are still free to move and shift and thus still pose a hazard to people walking in the area.

An alternative to the use of conventional tape to hold the cables in place involves the use of a substantially rigid, elongate bridge cover which extends along and over a cable for some length of the cable. Such rigid bridge covers are suitable for covering substantial lengths of cable, but the covers simply rest on the support surface and are not adhesively attached thereto, and so they may easily shift or move if bumped. Further, the covers cannot be bent or molded into desired shapes to accommodate a variety of cable path configurations, but rather can only be used to cover a cable which lies in a path whose shape coincides to that of the rigid bridge cover.

SUMMARY OF THE INVENTION

It is an object of the invention, in view of the above-described prior art deficiencies, to provide a hold-down tape or cover and accompnaying method for securing electrical, mechanical and other cables and the like to a support surface or together without leaving a sticky adhesive residue on the cables.

It is also an object of the invention, in accordance with one aspect thereof, to provide such a tape or cover which may be configured to cover substantially any pathway traversed by a cable or hose to be held on a support surface.

It is an additional object of the invention to provide such a tape or cover suitable for holding a cable or the like on a support surface substantially along the length of the cable.

The above and other objects of the invention are realized in a specific illustrative embodiment of a cover and method for holding down electrical and mechanical cables and the like on a support surface, where the cover includes an elongate subtrate material having top and bottom surfaces and includes adhesive zones disposed on the bottom surface at the side edges of the substrate for attaching the tape to the support surface. A center zone of the strip extending the length thereof on the bottom surface is free of adhesive.

In use, the tape is placed over a cable or similar object to be held on a support surface so that the center section contacts the cable and the side edges contact and adhere to the support surface to hold the cable in place. Since only the center zone of the tape, containing no adhesive, contacts the cable, upon removal of the tape from over the cable, no sticky or gummy residue is left on the cable.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
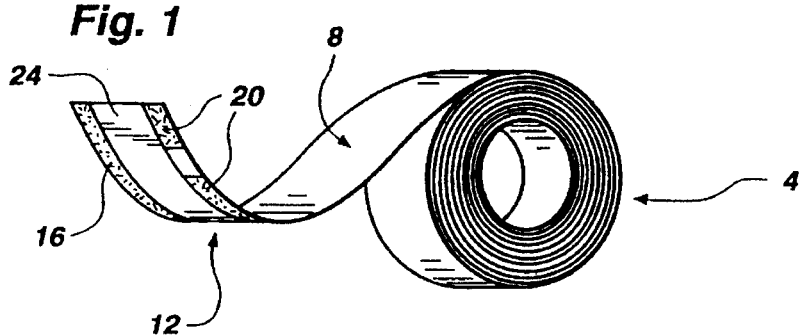
FIG. 1 is a perspective view of a roll of tape made in accordance with the principles of the present invention.

Referring to FIG. 1, there is shown a roll of flexible tape 4 suitable for use in securing electrical, mechanical, and fluid hoses, cables, wires, conduits and similar elongate objects to a support surface. The tape is formed of a substrate having a top adhesive-free surface 8 and a bottom adhesive-bearing surface 12. The top surface can be provided with a visaully perceptible indicia such as colored pattern to warn persons of the presence of covered cables or a pattern to disguise the presence of the covered cables.

The substrate preferably comprises a thin, elongate strip of flexible material. The substrate can also preferably comprise a number of different materials depending upon the intended use of the tape. The substrate of the tape 4 might illustratively be made of any suitable flexible synthetic or natural material such as vinyl and other flexible plastics or woven fabric.

For example, when the tape is used to temporarily hold down electrical cables and similar objects, the substrate can comprise a polyethylene, polyester, polypropylene, or some other plastic material as is known in the art. The material and the thickness of the material for the substrate should be selected in accordance with the intended use of the tape and the properties of potential substrate material which are well-known in the industry. It is generally preferable that a scrim material be included in the substrate and that the substrate be hand tearable.

Further substrates can also be used in accordance with the present invention to carry out particular intended uses of the tape. For example, a rubber-like material can be utilized where the end uses of the tape would require a more resilient and tougher substrate. Even further, a metal substrate, for example a metal foil, can also be used within the scope of the present invention. Substrates which possess lateral rigidity and strength are particularly useful in industrial settings where the tape or cover must protect the cables and the like from damage. It is also within the scope of the present invention to combine one or more of these materials as a substrate, for example, laminating a metal material with a plastic or rubber-like material thus providing the desirable characteristics of both materials.

Still referring to FIG. 1, disposed on the bottom surface 12 is a conventional adhesive shown positioned in a continuous strip 16 at one side edge, and at spaced-apart locations 20 at the other side edge. Disposed between the two side edges containing adhesive is a central adhesive-free zone 24. The tape of FIG. 1 is shown with the continuous zone of adhesive 16 and the intermittent strips 20 for purposes of illustration as to how the adhesive might be applied to the bottom surface 12 of the tape 4. That is, continuous zones of adhesive could be positioned at both side edges on the bottom surface of the tape, or intermittent strips could likewise be positioned at both side edges.

It will be appreciated that the central adhesive-free section 24 provides great advantages over the prior art and that many different configurations for the adhesive placed on both sides of the central adhesive-free zone 24 can be arrived at by those skilled in the art using the information set forth herein. For example, the adhesive can be laid down on the bottom surface 12 of the tape 4 in a variety of intermittent patterns, including a plurality of parallel strips of adhesive, which can be devised by those skilled in the art and the advantages of the present invention still be fully retained.

Use of a sparser intermittent pattern of adhesive allows for easier removal of the cover from a support surface, as will be discussed momentarily, while use of a heavier pattern or continuous strips would provide a somewhat more secure holding of a cable on the support surface, as will also be discussed momentarily.

The adhesive 16 and 20 might illustratively be composed of acrylic adhesive, latex adhesive, rubber-based adhesive, or other conventional adhesives such as used for example with pressure sensitive tape, i.e., conventional duct tape, masking tape, etc., as is known to those skilled in the art. All such adhesives generally allow for adhering the tape to a surface, but will release the tape when it is pulled up.

It is also within the scope of the present invention to utilize adhesives which provide a permanent or semi-permanent or non-releasable hold. Two part epoxy adhesives suitable for use with the present invention are available in the industry. In some applications, a water-resistant adhesive can be used for a cover being used in an industrial application or in a medical application where the tape 4 covers tubing, cables, or sutures in a moist environment, such as on a patient's skin. Those skilled in the art can also select a permanent or semi-permanent adhesive from those available in the industry where the tape 4 is to be removed only with elevated effort. The use of such permanent and semi-permanent adhesives will generally provide the most benefit when more durable substrates, discussed above, are utilized.

Figure 2:
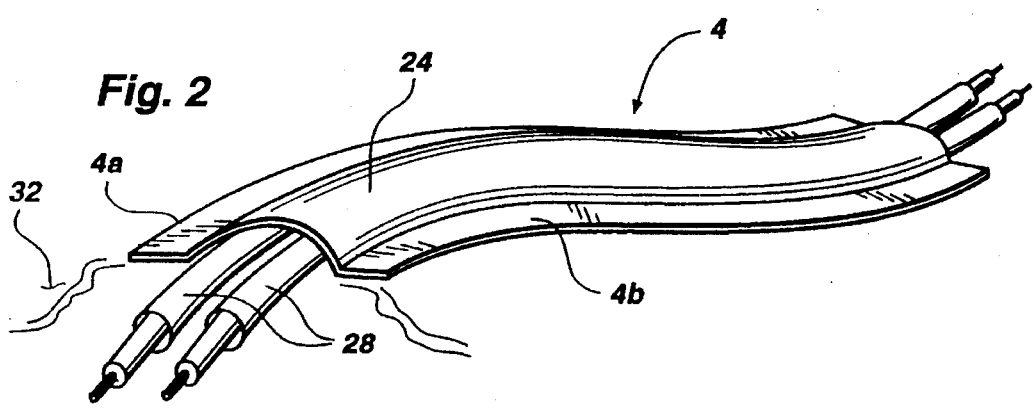
FIG. 2 is a perspective view of a section of the tape of FIG. 1 shown holding a pair of cables against a support surface.

FIG. 2 shows the tape 4 positioned to bridge over and extend lengthwise with a pair of cables 28. Side edges 4a and 4b of the tape are placed in contact with a support surface 32 to adhere thereto, while the central section 24 bridges over, contacts and holds down the cables 28. Each of the side edges 4a and 4b act as feet. Since the central section 24 includes no adhesive, and since the central section is the only part of the tape in contact with the cables 28, no adhesive from the tape comes in contact with the cables and of course none can thus remain on the cables when the tape is removed. Since the preferred tape is flexible and bendable, it can be manipulated to coincide and overlay curving or other irregular pathways followed by cables. Advantageously, it is preferred that the width of the adhesive strips is significantly less than the width of the non-adhesive portion, e.g., for a tape width of about 4 inches, the width of each adhesive strip area is advantageously about ½ inch or about ⅙ the width of the non-adhesive portion, to allow for collecting and holding a number of cables without having the cables contact the adhesive portions. It is within the scope of the present invention to utilize other dimensions for the adhesive area and the tape 4. Moreover, it is also within the scope of the present invention to provide the tape 4 in descrete lengths rather than in the roll illustrated in FIG. 1.

Figure 3:
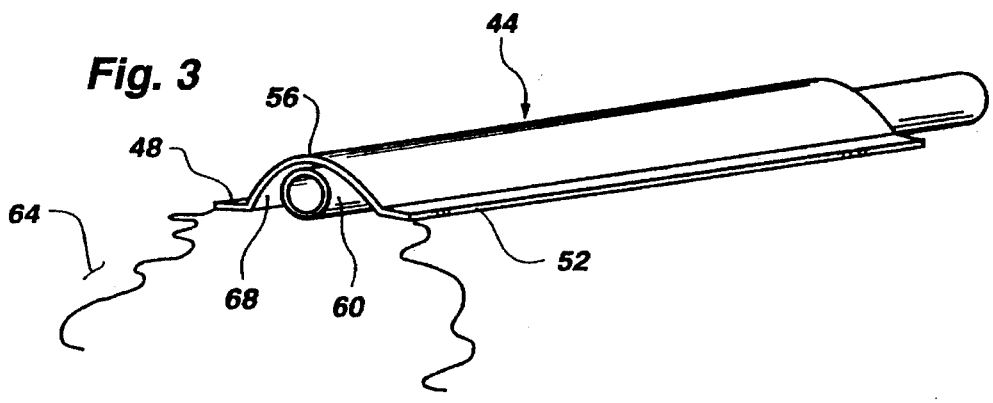
FIG. 3 shows a perspective view of a cover for covering and holding down cables, in accordance with the principles of the present invention.

FIG. 3 shows another embodiment of the cover of the present invention. This embodiment includes a strip of material 44 having a bridge cross section with two spaced-apart feet 48 and 52 and a central section 56 extending from the top of one foot to the top of the other foot to bridge over a cable 60 which is to be held in place on a surface 64. Advantageously, the feet 48 and 52 and central section 56 are integrally formed. As shown in FIG. 3, the feet 48 and 52 and central roof section 56 combine to form an arcuate upper surface area, and to define a tunnel 68 in which the cable 60 is disposed. The embodiment illustrated in FIG. 3 can be fabricated using any of the materials and structures described in connection with FIGS. 1 & 2.

Disposed on a bottom surface of the feet 48 and 52 is adhesive for contacting the support surface 64 to secure the cover 44 thereagainst, in a manner similar to that shown in FIG. 2. Provision of the adhesive allows for more securely positioning the cover 44 on a support surface so that it can generally resist sliding or other movement to thereby more securely hold the cable 60 in place. Particular advantages accrue when the cover 44 is preferably made of a semi-flexible plastic such as polypropylene, vinyl or polyethylene and the adhesive is coated on the bottom surface of the feet 48 and 52. Cover strips of plastic (not illustrated) can preferably be removably placed over the adhesive on the feet 48 and 52 until the time of use of the cover 44. The cover 44 is advantageous for more permanent positioning of cables and the like.

Figure 4:
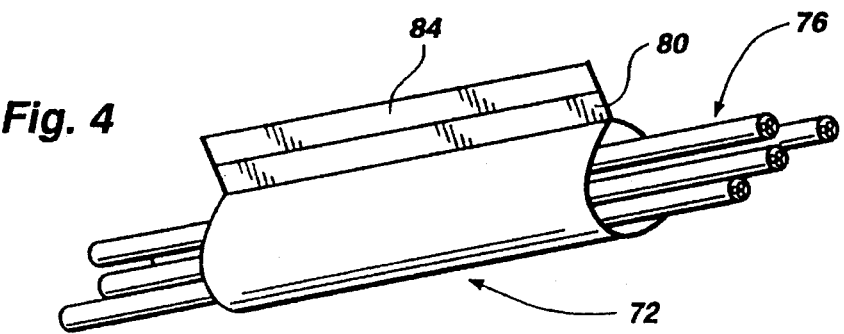
FIG. 4 shows a perspective, fragmented view of another use of the tape and cover shown in FIGS. 1–3, to gather and hold cables together and to a support surface.

FIG. 4 shows another use of the tapes and covers of FIGS. 1–3 whereby a length of tape or cover 72 is wrapped about a bundle of cables 76 so that the adhesive on one side 80 of the tape contacts and adheres to a section of the other side of the tape running parallel with an adhesive strip 84 on the other side. Joining the side edges of the tape or cover 72 in this fashion about the cable bundle 76 leaves adhesive strip 84 exposed to allow the strip to contact and adhere to a surface against which the cables are to be held.

If it is simply desired to hold the cable 76 in a bundle, then the adhesive strips on opposite sides of the tape can be placed in contact with one another so that there was no exposed adhesive (and so the tape and bundle could not be attached to any surface).

In all embodiments of the invention, the cable(s), hose(s), wire(s), conduit(s) and similar elongate object(s) will typically be placed in position adjacent to one another at their desired location, and then the tape or cover is positioned either to bridge over the cables and adhere to a surface (as shown in FIGS. 2 and 3) or to wrap about the cables for maintaining them in a bundle to then attach them to a surface with the exposed adhesive or simply leave them bundled but unattached (FIG. 4).

In the manner described, a tape or cover having adhesive zones on the bottom surface with a central adhesive-free zone, can be placed to hold electrical cables and the like in a bundle and on a support surface, without any adhesive contacting the cables to leave a sticky or gummy residue thereon. The tape or cover can be easily placed over the cable and removed from thereover when finished.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed and desired to be secured by United States Letters Patent is:

1. An article of manufacture for retaining cables, wires, conduit, and the like on a support surface, said article comprising a thin, elongate strip of flexible material having top and bottom surfaces and a pair of longitudinal edges and including a pressure-sensitive adhesive disposed on the bottom surface in the form of two laterally spaced apart strips of approximately equal width, each said strip having an inner and an outer longitudinal edge, the outer longitudinal edges of each strip directly overlying a corresponding longitudinal edge of said flexible material, an elongate adhesive-free central section extending between the inner longitudinal edges of said adhesive strips such that a cable, wire, conduit, or the like, disposed beneath said article in use does not come into contact with the adhesive of the article, said article being so flexible that in use it is capable of bridging over underlying cables, wires, conduits, and the like in a bridge cross-section and being capable of coinciding and overlying curving or irregular pathways followed by underlying cables, wires, conduits, or the like.

* * * * *

UNITED STATES PATENT AND TRADEMARK OFFICE
CERTIFICATE OF CORRECTION

PATENT NO. : 5,593,756
DATED : January 14, 1997
INVENTOR(S) : Terry Q. Miller

It is certified that error appears in the above-indentified patent and that said Letters Patent is hereby corrected as shown below:

Column 6, line 21, claim 1, should read as follows:
like in a bridge cross-section.

Column 6, claim 2, should read as follows:
The article of manufacture of claim 1 wherein the article of manufacture is capable of coinciding and overlying curving or irregular pathways followed by underlying cables, wires, conduits, or the like.

Signed and Sealed this

Sixth Day of May, 1997

*Attest:*

BRUCE LEHMAN

*Attesting Officer*  *Commissioner of Patents and Trademarks*